United States Patent
Toltsch et al.

(10) Patent No.: US 11,407,886 B2
(45) Date of Patent: Aug. 9, 2022

(54) SINGLE-SITE CATALYST BASED IMPACTED COPOLYMERS WITH EXCELLENT MECHANICAL AND OPTICAL PROPERTIES

(71) Applicant: BOREALIS AG, Vienna (AT)

(72) Inventors: Wilfried Peter Toltsch, Marchtrenk (AT); Jingbo Wang, Engerwitzdorf (AT); Markus Gahleitner, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 207 days.

(21) Appl. No.: 16/955,623

(22) PCT Filed: Jan. 4, 2019

(86) PCT No.: PCT/EP2019/050127
§ 371 (c)(1),
(2) Date: Jun. 18, 2020

(87) PCT Pub. No.: WO2019/134951
PCT Pub. Date: Jul. 11, 2019

(65) Prior Publication Data
US 2021/0054180 A1 Feb. 25, 2021

(30) Foreign Application Priority Data

Jan. 5, 2018 (EP) .................... 18150441

(51) Int. Cl.
C08L 23/14 (2006.01)
C08K 5/00 (2006.01)
C08L 23/12 (2006.01)
C08L 23/16 (2006.01)

(52) U.S. Cl.
CPC .......... *C08L 23/142* (2013.01); *C08K 5/0083* (2013.01); *C08L 23/12* (2013.01); *C08L 23/16* (2013.01); *C08L 2205/02* (2013.01); *C08L 2207/02* (2013.01)

(58) Field of Classification Search
CPC ...... C08L 23/142; C08L 53/02; C08L 53/025; C08L 2205/025; C08L 2205/03; C08L 2207/02
See application file for complete search history.

(56) References Cited

U.S. PATENT DOCUMENTS

2016/0280899 A1* 9/2016 Töltsch ................. C08L 23/142

FOREIGN PATENT DOCUMENTS

| EP | 0316187 A2 | 3/1990 |
| EP | 0887379 A1 | 12/1998 |
| EP | 2557118 A1 | 2/2013 |
| EP | 2891667 A1 | 7/2015 |
| EP | 3199586 A1 | 8/2017 |
| WO | 9212182 A1 | 7/1992 |
| WO | 9924479 A1 | 5/1999 |
| WO | 2010009827 A1 | 1/2010 |
| WO | 2010052260 A1 | 5/2010 |
| WO | 2010052263 A1 | 5/2010 |
| WO | 2010052264 A1 | 5/2010 |
| WO | 2013007650 A1 | 1/2013 |
| WO | 2015158790 A2 | 10/2015 |

OTHER PUBLICATIONS

C. Grein, M. Gahleitner, B. Knogler & S. Nestelberger, Melt viscosity effects in Ethylene-Propylene Copolymers, Rheol. Acta, 46 (2007) 1083-1089.
"200 and More NMR Experiments: A Practical Course", S. Berger and S. Braun, 2004, Wiley-VCH, Weinheim.
Busico, V., Cipuilo, R., Prog. Polym. Sci. 26 (2001) 443.
Busico, V., Carbonniere, P., Cipuilo, R., Pellecchia, R., Severn, J., Talarico, G., Macromol. Rapid Commun. 2007, 28, 11289.
Busico, V.; Cipuilo, R., Monaco, G., Vacatello, M., Segre, A.L., Macromolecules 30 (1997) 6251.
Resconi, L., Cavallo, L., Fait, A., Piemontesi, F., Chem. Rev. 2000, 100, 1253.
Zhou, Z., Kuemmerle, R., Qiu, X., Redwine, D., Cong, R., Taha, A., Baugh, D. Winniford, B., J. Mag. Reson. 187 (2007) 225.

* cited by examiner

Primary Examiner — Jeffrey C Mullis
(74) Attorney, Agent, or Firm — Tarolli, Sundheim, Covell & Tummino LLP

(57) ABSTRACT

The present invention relates to a heterophasic propylene polymer (HECO) comprising a) 65 to 90 wt. % of a matrix component (M) selected from a propylene homo- or random copolymer (PP); and b) 10 to 35 wt. % of an ethylene-propylene rubber (EPR), dispersed in the propylene homo- or random copolymer (PP), whereby the xylene cold soluble fraction (XCS) of the heterophasic propylene polymer (HECO) has—an ethylene content of 10.0 to 17.0 wt. %; —an intrinsic viscosity (IV), determined according to ISO 1628-1:2009, of at least 1.6 dl/g; and the xylene cold insoluble fraction (XCI) of the heterophasic propylene polymer (HECO) has 2, 1-erythro regiodefects in an amount of at least 0.4 mol % to a composition comprising the heterophasic propylene polymer (HECO), a process for its preparation and an article comprising the heterophasic propylene polymer (HECO) or the composition comprising the same.

15 Claims, No Drawings

SINGLE-SITE CATALYST BASED IMPACTED COPOLYMERS WITH EXCELLENT MECHANICAL AND OPTICAL PROPERTIES

The present invention is directed to impact copolymers having an excellent combination of mechanical and optical properties, a method for their manufacture, an article comprising the inventive polymers and the use of the inventive polymers.

Conventional heterophasic polypropylene polymers are based on a matrix phase and a partly amorphous, partly crystalline $C_3/C_2$ phase. Heterophasic polymers can be formed using heterogeneous Ziegler Natta catalysis and such polymers typically comprise a crystalline PE phase as well as the matrix phase and partially amorphous phase. In contrast, single-site catalyst produced heterophasic copolymers have a matrix phase and largely amorphous EPR phase. These polymers however, suffer from a number of design problems.

One problem is the dispersion of the elastomeric component in the matrix, due in part to the particle size of the elastomeric phase. Problems can also arise due to the viscosity ratio between elastomeric component and matrix (PP) phase, and the compatibility between these two phases. Incompatibility is a result of the compositional differences between the materials. Good compatibility could, in principle, be achieved at high propylene ($C_3$) content (and hence low ethylene ($C_2$) content) in the rubber phase which, however, leads to a higher glass transition temperature ($T_g$), again limiting the performance at very low temperatures, such as below −10° C.

EP 2 891 667 describes heterophasic polypropylenes having a high ethylene content in the rubber which, in turn, leads to improved mechanical properties. However, the optical properties as well as the brittle-to-ductile transition temperature can still be improved.

It has been surprisingly found that an improved balance of mechanical and optical properties can be achieved by using a rubber having a comparably low ethylene content.

The present invention therefore provides a heterophasic propylene polymer (HECO) comprising
 a) 65 to 90 wt. % of a matrix component (M) selected from a propylene homo- or random copolymer (PP); and
 b) 10 to 35 wt. % of an ethylene-propylene rubber (EPR), dispersed in the propylene homo- or random copolymer (PP),
whereby
the xylene cold soluble fraction (XCS) of the heterophasic propylene polymer (HECO) has
 an ethylene content of 10.0 to 17.0 wt. %;
 an intrinsic viscosity (IV), determined according to ISO 1628-1:2009, of at least 1.6 dl/g; and
the xylene cold insoluble fraction (XCI) of the heterophasic propylene polymer (HECO) has 2,1-erythro regiodefects in an amount of at least 0.4 mol %.

The polymer of the present invention shows an improved balance of mechanical properties, such as flexural modulus, brittle-to-ductile transition temperature & Charpy notched impact strength, and optical properties, e.g. haze. Particularly the polymer of the present invention as such already has a low brittle-to-ductile transition temperature (BDTT). However, by adding a nucleating agent unexpectedly the BDTT can further be lowered, if needed. Moreover, the polymers show good mechanical performance at low temperatures such as −10° C. or even lower albeit the low ethylene content of the EPR.

The term "multimodal" means herein, unless otherwise stated, multimodality with respect to molecular weight distribution. Usually, a polypropylene, comprising at least two polypropylene fractions, which have been produced under different polymerization conditions resulting in different (weight average) molecular weights and molecular weight distributions for the fractions, is referred to as "multimodal". The prefix "multi" relates to the number of distinguishable polymer fractions present in the polymer. The prefix "multi" can be used herein to refer to two or three or more than three distinguishable components in the polymer. The form of the molecular weight distribution curve, i.e. the appearance of the graph of the polymer weight fraction as a function of its molecular weight, of a multimodal polymer will often show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

Matrix Component (M)/Xylene Cold Insoluble Fraction (XCI):

As well-known matrix component (M) and xylene cold insoluble fraction (XCI) are not exactly the same as a minor amount of the matrix component (M) as produced in the reactor may remain soluble in cold xylene and a minor amount of the disperse phase may not remain dissolved in cold xylene. However, in the heterophasic propylene polymer (HECO) according to the present invention both fractions are roughly the same. In the following the properties of both are given whereby it is clearly indicated to which the property belongs. Furthermore, in the present invention the terms "xylene cold insoluble fraction", "xylene cold insolubles" and "(XCI)" are used interchangeably.

The matrix component (also denoted as the matrix phase) is selected from a propylene homopolymer or propylene random copolymer (PP). The propylene random copolymer is preferably a propylene-ethylene random copolymer. Such a polymer usually consists of propylene and ethylene. The propylene content in the matrix component (M) is usually 96.0 wt % or more, preferably 97.0 wt % or more, more preferably 98.0 wt % or more, ideally 98.5 wt % or more. Even more preferably there is at least 99.0 wt % propylene in the matrix component (M), such as at least 99.5 wt %. It is therefore preferred that the propylene content of the xylene cold insoluble fraction of the heterophasic propylene polymer (HECO) is 96.0 wt % or more, preferably 97.0 wt % or more, more preferably 98.0 wt % or more, ideally 98.5 wt % or more. Even more preferably there is at least 99.0 wt % propylene in the xylene cold insoluble fraction, such as at least 99.5 wt %.

The comonomer used in the matrix component (M), if present, is preferably an alpha-olefin such as $C_2$ or $C_4$ to $C_{10}$ alpha olefins. However, preferably, in case one or more comonomer(s) is/are present one of these comonomers is ethylene, more preferably the matrix component consists of propylene and, optionally, ethylene.

Most preferably, the matrix component (M) is a propylene homopolymer.

The matrix component (M) preferably has an MFR, determined according to ISO 1133 at 230° C. and under a load of 2.16 kg, of 1.0 to 100 g/10 min, more preferably 6.0 to 80 g/10 min, even more preferably 20 to 50 g/10 min and most preferably 30 to 40 g/10 min.

The intrinsic viscosity (IV) of the xylene cold insoluble fraction (XCI), determined according to DIN ISO 1628: 2009 is preferably within the range of 1.1 to 3.4 dl/g, more preferably 1.2 to 2.5 dl/g, even more preferably 1.3 to 2.0 dl/g and most preferably 1.4 to 1.8 dl/g.

The xylene cold insoluble fraction (XCI) of the heterophasic propylene polymer (HECO) has 2,1-erythro regiodefects in an amount of at least 0.4 mol %. Usually the amount of 2,1-erythro regiodefects in the xylene cold insoluble fraction (XCI) of the heterophasic propylene polymer (HECO) is not higher than 1.5 mol %. As well-known in the art, the amount of 2,1-erythro regiodefects in propylene homo- or random copolymers produced with a Ziegler-Natta catalyst is 0.0 mol %. Thus, the heterophasic propylene polymer (HECO) is usually produced using a single-site catalyst such as a metallocene catalyst. Suitable catalysts are provided below.

The xylene cold insoluble fraction preferably has a glass transition temperature from −15° C. to 5.0° C., more preferably from −10 to −2.0° C. and most preferably from −5.0 to −1.0° C.

The matrix component (M) may be unimodal or multimodal, e.g. bimodal. Preferably the matrix component (M) is multimodal, more preferably bimodal.

Ethylene-Propylene Rubber (EPR)/Xylene Cold Soluble Fraction (XCS)

In the present invention the terms "xylene cold soluble fraction", "xylene cold solubles" and "(XCS)" are used interchangeably.

The xylene cold soluble fraction (XCS) of the heterophasic propylene polymer (HECO) has an ethylene content of 10.0 to 17.0 wt. %, preferably 11.0 to 17.0 wt. % and most preferably 12.0 to 16.0 wt. %.

The xylene cold soluble fraction (XCS) of the heterophasic propylene polymer (HECO) has an intrinsic viscosity (IV), determined according to ISO 1628-1:2009, of at least 1.6 dl/g. Usually the intrinsic viscosity (IV), determined according to ISO 1628-1:2009, is not higher than 3.5 dl/g.

Preferably, intrinsic viscosity (IV), determined according to ISO 1628-1:2009, is within the range of 1.8 to 3.5 dl/g, more preferably between 2.0 and 3.0 dl/g and most preferably between 2.0 and 2.6 dl/g.

Preferably the intrinsic viscosity (IV) of the xylene cold solubles fraction (XCS) is higher than the intrinsic viscosity (IV) of the xylene cold insoluble fraction (XCI), more preferably the intrinsic viscosity (IV) of the xylene cold solubles fraction (XCS) is higher by 0.25 dl/g compared with the intrinsic viscosity (IV) of the xylene cold insoluble fraction (XCI) and most preferably the intrinsic viscosity (IV) of the xylene cold solubles fraction (XCS) is higher by 0.50 dl/g compared with the intrinsic viscosity (IV) of the xylene cold insoluble fraction (XCI).

The ratio of the intrinsic viscosity (IV) of the xylene cold solubles fraction (XCS) to the intrinsic viscosity (IV) of the xylene cold insoluble fraction (XCI), is preferably within the range of 1.2 to 5.0, more preferably 1.4 to 3.5 and most preferably 1.5 to 3.0.

The glass transition temperature of the xylene cold soluble fraction (XCS) is −29.0° C. or higher, e.g. −28.0° C. or higher, preferably from −29.0° C. to −25.0° C., more preferably from −28.0 to −26.0° C. and most preferably from −28.0 to −27.0° C.

The MFR$_2$ of the xylene cold solubles (XCS) is preferably in the range of 0.05 to 80 g/10 min, more preferably in the range of 0.40 to 55 g/10 min and most preferably in the range of 1.5 to 40 g/10 min.

The MFR value of a component can frequently not be measured directly. Therefore, in the present invention they are calculated from intrinsic viscosity measurements based on the correlations defined in C. Grein, M. Gahleitner, B. Knogler & S. Nestelberger, *Melt viscosity effects in Ethylene-Propylene Copolymers*, Rheol. Acta, 46 (2007) 1083-1089. From the MFR of the total polymer and the MFR of the XS fraction (sometimes called the XCS fraction), the MFR of the matrix component of an impact copolymer can be calculated using a logarithmic mixing rule, i.e. using the following equation $$MFR(total) = 10^{(1-w(EPR)) \log_{10}(MFR(Matrix)) + w(EPR) \log_{10}(MFR(XCS))}$$

with w(EPR) being the weight fraction of the elastomeric phase, approximated by the weight fraction of the xylene cold solubles.

The EPR may be unimodal or multimodal, e.g. bimodal. Preferably the EPR is unimodal.

Heterophasic Propylene Polymer (HECO)

The polymer of the invention is a heterophasic ethylene/propylene copolymer. By heterophasic is meant that the polymer contains both a crystalline portion and an amorphous portion. It is usually and preferably made using a single-site catalyst material, e.g. one as herein defined.

The heterophasic propylene polymer (HECO) comprises
a) 65 to 90 wt. %, preferably 70 to 90 wt. % and most preferably 70 to 80 wt. % of the matrix component (M) selected from a propylene homo- or random copolymer (PP); and
b) 10 to 35 wt. %, preferably 10 to 30 wt. % and most preferably 20 to 30 wt. % of the ethylene-propylene rubber (EPR), dispersed in the propylene homo- or random copolymer (PP).

The heterophasic propylene polymer (HECO) preferably has an MFR, determined according to ISO 1133 at 230° C. and under a load of 2.16 kg, of 3.0 to 100 g/10 min, more preferably 3.0 to 40 g/10 min, and most preferably 4.0 to 20 g/10 min.

The ratio of the MFR of the matrix component (M) to the MFR of the (HECO), both determined according to ISO 1133 at 230° C. and under a load of 2.16 kg is preferably at least 2.0, more preferably at least 3.0 and most preferably at least 3.5. Usually the ratio will not exceed 6.0.

The total propylene content in the heterophasic propylene polymer (HECO) is preferably 85 to 98.8 wt. %, more preferably 90 to 98 wt. % and most preferably 90 to 97 wt. %.

The comonomers present in the heterophasic propylene polymer (HECO) are ethylene which is at least present in the EPR and, optionally an alpha-olefin such as $C_2$ or $C_4$ to $C_{10}$ alpha olefins. Preferably the only comonomer present is ethylene.

Preferably the amount of the XCS fraction based on the heterophasic propylene polymer (HECO) 10 to 35 wt. %, preferably 10 to 30 wt. % and most preferably 20 to 30 wt. %, e.g. 28 to 30 wt. %.

The heterophasic propylene polymer (HECO) preferably has a melting temperature $T_m$ of 143 to 160° C.

The heterophasic propylene polymer (HECO) preferably has a brittle-to-ductile transition temperature (BDTT) of −5.0° C. or below, more preferably −6.5° C. or below and most preferably −8.0° C. or below. The brittle-to-ductile transition temperature (BDTT) of the heterophasic propylene polymer (HECO) will usually not be below −30° C.

Preferably the Charpy notched impact strength of the heterophasic propylene polymer (HECO), determined according to ISO 179-1eA:2000 and at a temperature of −19° C., is at least 2.0 kJ/m$^2$, more preferably at least 3.0 kJ/m$^2$. The Charpy notched impact strength of the heterophasic propylene polymer (HECO), determined according to ISO 179-1eA:2000 and at a temperature of −19° C., will usually not be above 15 kJ/m$^2$.

Preferably the Charpy notched impact strength of the heterophasic propylene polymer (HECO), determined according to ISO 179-1eA:2000 and at a temperature of +23° C., is at least 40.0 kJ/m$^2$, more preferably at least 45.0 kJ/m$^2$. The Charpy notched impact strength of the heterophasic propylene polymer (HECO), determined according to ISO 179-1eA:2000 and at a temperature of +23° C., will usually not be above 90 kJ/m$^2$.

The flexural modulus of the heterophasic propylene polymer (HECO), determined according to ISO 178, is preferably at least 525 MPa, more preferably at least 575 MPa and most preferably at least 625 MPa. Usually the flexural modulus of the heterophasic propylene polymer (HECO) will not exceed 950 MPa.

The haze of the heterophasic propylene polymer (HECO), determined according to ASTM D 1003-07 on 1 mm thick specimen, is preferably 80% or below, more preferably 65% or below and most preferably 55% or below.

As outlined above the xylene cold insoluble fraction (XCI) of the heterophasic propylene polymer (HECO) has 2,1-erythro regiodefects in an amount of at least 0.4 mol % whereas the amount of 2,1-erythro regiodefects in propylene homo- or random copolymers produced with a Ziegler-Natta catalyst is 0.0 mol %.

Hence, the heterophasic propylene polymer (HECO) according to the invention is preferably being obtainable by a single-site catalyst, more preferably being obtainable by a metallocene catalyst.

The metallocene catalyst is preferably according to the following formula (I).

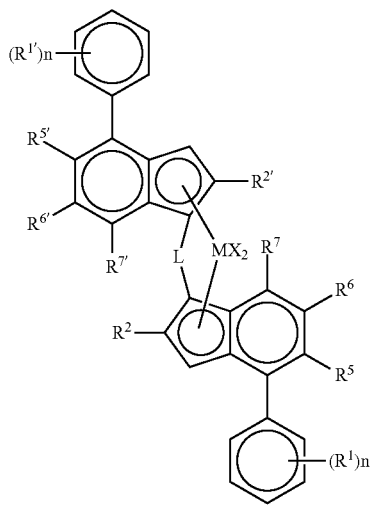

(I)

wherein
M is Hf or Zr, preferably Zr
X is a sigma ligand, preferably each X is independently a hydrogen atom, a halogen atom, $C_1$-$C_6$-alkoxy group, $C_1$-$C_6$-alkyl, phenyl or benzyl group, more preferably each X is independently Cl or a methyl group and most preferably each X is either Cl or a methyl group;

L is a bridge of the formula —SiR$^8$$_2$—, wherein each R$^8$ is independently a $C_1$-$C_{20}$-hydrocarbyl group, tri($C_1$-$C_{20}$-alkyl)silyl, preferably each R$^8$ is independently a $C_1$-$C_{20}$-linear, branched or cyclic alkyl group, a $C_6$-$C_{20}$-aryl, $C_7$-$C_{20}$-arylalkyl or $C_7$-$C_{20}$-alkylaryl group, more preferably a $C_1$-$C_{20}$-linear, branched or cyclic alkyl group, even more preferably a linear or branched $C_1$-$C_{20}$ alkyl group or a $C_3$-$C_{10}$ cycloalkyl group, even more preferably a linear or branched $C_1$-$C_6$ alkyl group or a $C_3$-$C_7$ cycloalkyl group, e.g. methyl, ethyl, n-propyl, i-propyl, n-butyl or tert.-butyl, even more preferably, both R$^8$ are the same and are selected from methyl, ethyl, n-propyl, i-propyl, n-butyl or tert.-butyl, even more preferably methyl or ethyl, even more preferably both R$^8$ are methyl;

n is 0, 1 or 2, preferably 1 or 2 and most preferably 1;

R$^1$ and R$^{1'}$ are the same or can be different and can be a linear or branched $C_1$-$C_6$-alkyl group, preferably linear or branched $C_1$ to $C_4$ alkyl group, e.g. methyl, tert.-butyl;

R$^2$ and R$^{2'}$ are the same or can be different and are a CH$_2$—R$^9$ group, with R$^9$ being H or linear or branched $C_1$-$C_6$-alkyl group, more preferably H or linear or branched $C_1$-$C_3$-alkyl, most preferably H;

R$^5$ and R$^{5'}$ are the same or are different and can be H or a linear or branched $C_1$-$C_6$-alkyl group, e.g. methyl, ethyl, n-propyl, i-propyl, n-butyl, i-butyl, sec.-butyl and tert.-butyl, or a OR group, wherein R is a $C_1$-$C_6$-alkyl group, preferably H or a linear or branched $C_1$-$C_4$-alkyl group or a OR group, wherein R is a $C_1$-$C_3$-alkyl group;

R$^6$ and R$^{6'}$ are the same or are different and can be H or a C(R$^{10}$)$_3$ group, with R$^{10}$ being the same or different and R$^{10}$ can be H or a linear or branched $C_1$-$C_6$-alkyl group, preferably H or a C(R$^{10}$)$_3$ group, with R$^{10}$ being the same or different and R$^{10}$ can be a linear or branched $C_1$-$C_3$-alkyl group;

or R$^5$ and R$^6$ and/or R$^{5'}$ and R$^{6'}$ taken together form an unsubstituted 4-7 membered ring condensed to the benzene ring of the indenyl moiety, preferably form an unsubstituted 5-6 membered ring condensed to the benzene ring of the indenyl moiety;
and R$^7$ and R$^{7'}$ can be the same or are different and can be H or a linear or branched $C_1$-$C_6$-alkyl group, more preferably H.

The single-site metallocene complex, especially the complexes defined by the formula (I) specified in the present invention, used for manufacture of the heterophasic propylene polymer (HECO) are symmetrical or asymmetrical. For asymmetrical complexes that means that the two indenyl ligands forming the metallocene complex are different, that is, each indenyl ligand bears a set of substituents that are either chemically different, or located in different positions with respect to the other indenyl ligand. More precisely, they are chiral, racemic bridged bis-indenyl metallocene complexes.

Whilst the complexes of the invention may be in their syn-configuration, ideally they are in their anti-configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the Figure below.

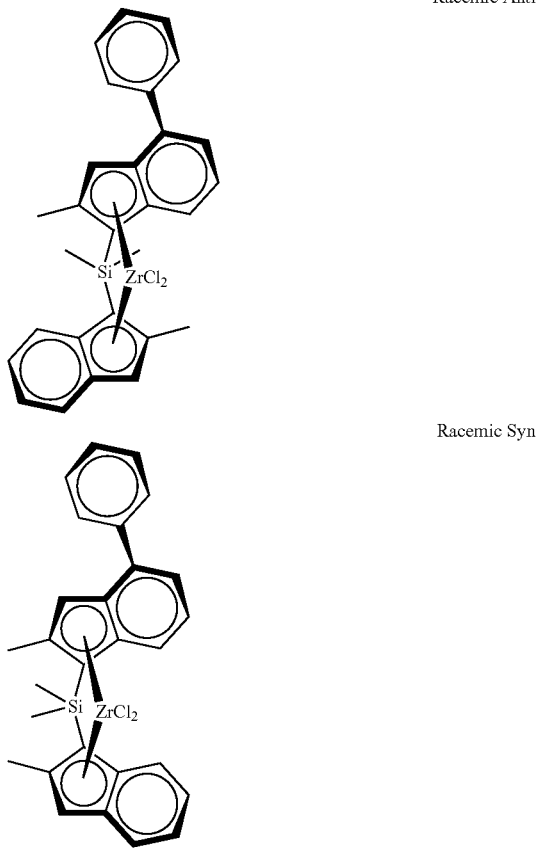

Racemic Anti

Racemic Syn

Formula (I) is intended to cover both, syn- and anti-configurations.

By nature of their chemistry, both anti and syn enantiomer pairs are formed during the synthesis of the complexes. However, by using the ligands of this invention, separation of the preferred anti-isomers from the syn-isomers is straightforward.

It is preferred that the metallocene complexes of the invention are employed as the racemic anti isomer. Ideally therefore at least 95% mol, such as at least 98% mol, especially at least 99% mol of the metallocene catalyst is in the racemic anti isomeric form.

In a preferred embodiment at least one of the phenyl groups is substituted with at least one of $R^1$ or $R^{1'}$, thus n can be 0 only for one of the ligands and not for both.

If n is 1, then $R^1$ and $R^{1'}$ are preferably on position 4 (para) of the phenyl ring and if n is 2 then $R^1$ and $R^{1'}$ are preferably on positions 3 and 5 of the phenyl ring.

Different combinations for R' and $R^{1'}$ are possible.

Both phenyl rings are substituted by $R^1$ and $R^{1'}$, whereby n can be the same or can be different for the two phenyl rings and is 1 or 2.

More preferably in the catalyst according to formula (I) M is Zr

X is independently a hydrogen atom, a halogen atom, or $C_1$-$C_6$-alkyl more preferably each X is independently Cl or a methyl group and most preferably each X is either Cl or a methyl group;

L is a bridge of the formula —$SiR^8_2$—, wherein each $R^8$ is independently a linear or branched $C_1$-$C_{20}$ alkyl group, even more preferably a linear or branched $C_1$-$C_6$ alkyl group, e.g. methyl, ethyl, n-propyl, i-propyl, n-butyl or tert.-butyl, even more preferably, both $R^8$ are the same and are selected from methyl, ethyl, n-propyl, i-propyl, n-butyl or tert.-butyl, even more preferably methyl or ethyl, even more preferably both $R^8$ are methyl;

n is 1 or 2, preferably each n is 1;

$R^1$ and $R^{1'}$ are the same or can be different and can be a linear or branched $C_1$ to $C_4$ alkyl group, e.g. methyl, tert.-butyl;

$R^2$ and $R^{2'}$ are the same or can be different and are a $CH_2$—$R^9$ group, with $R^9$ being H or linear or branched $C_1$-$C_3$-alkyl, most preferably H;

$R^5$ and $R^{5'}$ are the same or are different and can be H or a linear or branched $C_1$-$C_4$-alkyl group, e.g. methyl, ethyl, n-propyl, i-propyl, n-butyl, i-butyl, sec.-butyl and tert.-butyl, or a OR group, wherein R is a $C_1$-$C_3$-alkyl group;

$R^6$ and $R^{6'}$ are the same or are different and can be H or a $C(R^{10})_3$ group, with $R^{10}$ being the same or different and $R^{10}$ can be H or a $C(R^{10})_3$ group, with $R^{10}$ being the same or different and $R^{10}$ can be a linear or branched $C_1$-$C_3$-alkyl group;

or $R^5$ and $R^6$ and/or $R^{5'}$ and $R^{6'}$ taken together form an unsubstituted 5-6 membered ring condensed to the benzene ring of the indenyl moiety;

and $R^7$ and $R^{7'}$ are H.

In one variant both of $R^5$ and $R^6$ as well as $R^{5'}$ and $R^{6'}$ together form an unsubstituted 4-7, preferably 5-6 membered ring condensed to the benzene ring of the indenyl moiety and, optionally and preferably, $R^2$ and $R^{2'}$ each is a $C_1$ to $C_4$ alkyl group, more preferably methyl group. More preferably both of $R^5$ and $R^6$ as well as $R^{5'}$ and $R^{6'}$ form an unsubstituted 5 membered ring condensed to the benzene ring of the indenyl moiety and optionally and preferably, $R^2$ and $R^{2'}$ each is a methyl group.

In another variant it is also possible that at both ligands $R^5$ and $R^6$ as well as $R^{5'}$ and $R^{6'}$ are hydrogen.

Still a further possibility is that only one of the ligands is unsubstituted in position 5 and 6. In other words, $R^5$ and $R^6$ or $R^{5'}$ and $R^{6'}$ are hydrogen.

Especially preferred complexes of formula (I) are rac-dimethylsilanediylbis[2-methyl-4-(4-tert-butylphenyl)-1,5,6,7-tetrahydro-s-indacen-1-yl] zirconium dichloride rac-dimethylsilanediyl[2-methyl-4-(4-tert-butylphenyl)-inden-1-yl]1[2-methyl-4-(4-tert-butylphenyl)-5-methoxy-6-tert.-butyl-inden-1-yl] zirconium dichloride Suitable methods to prepare compounds according to formula (I) are well-known in the art and inter alia described in EP 2 891 667 and WO 2015/158790 which are herewith incorporated by reference.

In a preferred variant, the heterophasic propylene polymer (HECO) comprises a) 65 to 90 wt. %, preferably 70 to 90 wt. % and most preferably 70 to 80 wt. % of the matrix component (M) selected from a propylene homo- or random copolymer (PP); and b) 10 to 35 wt. %, preferably 10 to 30 wt. % and most preferably 20 to 30 wt. % of the ethylene-propylene rubber (EPR), dispersed in the propylene homo- or random copolymer (PP);

whereby
the xylene cold soluble fraction (XCS) of the heterophasic propylene polymer (HECO) has
an ethylene content of 10.0 to 17.0 wt. %, preferably 11.0 to 17.0 wt. % and most preferably 12.0 to 16.0 wt. %;
an intrinsic viscosity (IV), determined according to ISO 1628-1:2009, in the range of 1.6 dl/g to 3.5 dl/g, preferably in the range of 2.0 to 3.0 dl/g, more preferably between 2.0 and 2.6 dl/g;
the xylene cold insoluble fraction (XCI) of the heterophasic propylene polymer (HECO) has 2,1-erythro regiodefects in an amount of at least 0.4 mol % to not higher than 1.5 mol %;
and
the intrinsic viscosity (IV) of the xylene cold solubles fraction (XCS) is higher than the intrinsic viscosity (IV) of the xylene cold insoluble fraction (XCI), more preferably the intrinsic viscosity (IV) of the xylene cold solubles fraction (XCS) is higher by 0.25 dl/g compared with the intrinsic viscosity (IV) of the xylene cold insoluble fraction (XCI) and most preferably the intrinsic viscosity (IV) of the xylene cold solubles fraction (XCS) is higher by 0.50 dl/g compared with the intrinsic viscosity (IV) of the xylene cold insoluble fraction (XCI);
and/or, preferably and
the ratio of the intrinsic viscosity (IV) of the xylene cold solubles fraction (XCS) to the intrinsic viscosity (IV) of the xylene cold insoluble fraction (XCI), is within the range of 1.0 to 5.0, preferably 1.0 to 3.5 and most preferably 1.2 to 3.0;
and/or, preferably and
the glass transition temperature of the xylene cold soluble fraction (XCS) is −29.0° C. or higher, e.g. −28.0° C. or higher, preferably from −29.0° C. to −25.0° C., more preferably from −28.0 to −26.0° C. and most preferably from −28.0 to −27.0° C.

In another preferred variant, the heterophasic propylene polymer (HECO) comprises
a) 65 to 90 wt. %, preferably 70 to 90 wt. % and most preferably 70 to 80 wt. % of the matrix component (M) selected from a propylene homo- or random copolymer (PP); and
b) 10 to 35 wt. %, preferably 10 to 30 wt. % and most preferably 20 to 30 wt. % of the ethylene-propylene rubber (EPR), dispersed in the propylene homo- or random copolymer (PP);
whereby
the heterophasic propylene polymer (HECO) has an MFR, determined according to ISO 1133 at 230° C. and under a load of 2.16 kg, of 3.0 to 100 g/10 min, more preferably 3.0 to 40 g/10 min, and most preferably 4.0 to 20 g/10 min; the xylene cold soluble fraction (XCS) of the heterophasic propylene polymer (HECO) has
an ethylene content of 10.0 to 17.0 wt. %, preferably 11.0 to 17.0 wt. % and most preferably 12.0 to 16.0 wt. %;
an intrinsic viscosity (IV), determined according to ISO 1628-1:2009, in the range of 1.6 dl/g to 3.5 dl/g, preferably in the range of 2.0 and 3.0 dl/g, more preferably between 2.0 and 2.6 dl/g;
the xylene cold insoluble fraction (XCI) of the heterophasic propylene polymer (HECO) has 2,1-erythro regiodefects in an amount of at least 0.4 mol % to not higher than 1.5 mol %;
and
the intrinsic viscosity (IV) of the xylene cold solubles fraction (XCS) is higher than the intrinsic viscosity (IV) of the xylene cold insoluble fraction (XCI), more preferably the intrinsic viscosity (IV) of the xylene cold solubles fraction (XCS) is higher by 0.25 dl/g compared with the intrinsic viscosity (IV) of the xylene cold insoluble fraction (XCI) and most preferably the intrinsic viscosity (IV) of the xylene cold solubles fraction (XCS) is higher by 0.50 dl/g compared with the intrinsic viscosity (IV) of the xylene cold insoluble fraction (XCI);
and/or, preferably and
the ratio of the intrinsic viscosity (IV) of the xylene cold solubles fraction (XCS) to the intrinsic viscosity (IV) of the xylene cold insoluble fraction (XCI), is within the range of 1.0 to 5.0, preferably 1.0 to 3.5 and most preferably 1.2 to 3.0;
and/or, preferably and
the glass transition temperature of the xylene cold soluble fraction (XCS) is −29.0° C. or higher, e.g. −28.0° C. or higher, preferably from −29.0° C. to −25.0° C., more preferably from −28.0 to −26.0° C. and most preferably from −28.0 to −27.0° C.

In yet another preferred variant, the heterophasic propylene polymer (HECO) comprises
a) 70 to 90 wt. %, preferably 70 to 80 wt. % of the matrix component (M) selected from a propylene homo- or random copolymer (PP); and
b) 10 to 30 wt. %, preferably 20 to 30 wt. % of the ethylene-propylene rubber (EPR), dispersed in the propylene homo- or random copolymer (PP);
whereby
the heterophasic propylene polymer (HECO) has an MFR, determined according to ISO 1133 at 230° C. and under a load of 2.16 kg, of 3.0 to 40 g/10 min, preferably 4.0 to 20 g/10 min;
the xylene cold soluble fraction (XCS) of the heterophasic propylene polymer (HECO) has
an ethylene content of 10.0 to 17.0 wt. %, preferably 11.0 to 17.0 wt. % and most preferably 12.0 to 16.0 wt. %;
an intrinsic viscosity (IV), determined according to ISO 1628-1:2009, within the range of 2.0 and 3.0 dl/g, preferably between 2.0 and 2.6 dl/g;
the xylene cold insoluble fraction (XCI) of the heterophasic propylene polymer (HECO) has 2,1-erythro regiodefects in an amount of at least 0.4 mol % to not higher than 1.5 mol %;
and
the intrinsic viscosity (IV) of the xylene cold solubles fraction (XCS) is higher by 0.25 dl/g compared with the intrinsic viscosity (IV) of the xylene cold insoluble fraction (XCI), preferably the intrinsic viscosity (IV) of the xylene cold solubles fraction (XCS) is higher by 0.50 dl/g compared with the intrinsic viscosity (IV) of the xylene cold insoluble fraction (XCI);
and/or, preferably and
the ratio of the intrinsic viscosity (IV) of the xylene cold solubles fraction (XCS) to the intrinsic viscosity (IV) of the xylene cold insoluble fraction (XCI), is within the range of 1.0 to 3.5, preferably 1.2 to 3.0;
and/or, preferably and
the glass transition temperature of the xylene cold soluble fraction (XCS) is from 29.0° C. to −25.0° C., more preferably from −28.0 to −26.0° C. and most preferably from −28.0 to −27.0° C.

In yet another preferred variant, the heterophasic propylene polymer (HECO) comprises
a) 70 to 90 wt. %, preferably 70 to 80 wt. % of the matrix component (M) selected from a propylene homo- or random copolymer (PP); and
b) 10 to 30 wt. %, preferably 20 to 30 wt. % of the ethylene-propylene rubber (EPR), dispersed in the propylene homo- or random copolymer (PP);
whereby
the heterophasic propylene polymer (HECO) has an MFR, determined according to ISO 1133 at 230° C. and under a load of 2.16 kg, of 3.0 to 40 g/10 min, preferably 4.0 to 20 g/10 min;
the xylene cold soluble fraction (XCS) of the heterophasic propylene polymer (HECO) has
an ethylene content of 11.0 to 17.0 wt. %, preferably 12.0 to 16.0 wt. %;
an intrinsic viscosity (IV), determined according to ISO 1628-1:2009, within the range of 2.0 and 3.0 dl/g, preferably between 2.0 and 2.6 dl/g;
the xylene cold insoluble fraction (XCI) of the heterophasic propylene polymer (HECO) has 2,1-erythro regiodefects in an amount of at least 0.4 mol % to not higher than 1.5 mol %;
and
the intrinsic viscosity (IV) of the xylene cold solubles fraction (XCS) is higher by 0.25 dl/g compared with the intrinsic viscosity (IV) of the xylene cold insoluble fraction (XCI), preferably the intrinsic viscosity (IV) of the xylene cold solubles fraction (XCS) is higher by 0.50 dl/g compared with the intrinsic viscosity (IV) of the xylene cold insoluble fraction (XCI);
and
the ratio of the intrinsic viscosity (IV) of the xylene cold solubles fraction (XCS) to the intrinsic viscosity (IV) of the xylene cold insoluble fraction (XCI), is within the range of 1.0 to 3.5, preferably 1.2 to 3.0;
and
the glass transition temperature of the xylene cold soluble fraction (XCS) is from −29.0° C. to −25.0° C., more preferably from −28.0 to −26.0° C. and most preferably from −28.0 to −27.0° C.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts such as $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4^{2-}$ are also known. Suitable cocatalysts are described in WO2013/007650 which is herewith incorporated by reference.

Suitable amounts of cocatalyst will be well known to the person skilled in the art.

Manufacture of the Catalyst

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in a solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 contains comprehensive details of this process and is, thus, herewith incorporated by reference in its entirety.

Catalyst Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation. Such a catalyst prepolmyerisation step is also denoted "off-line prepolymerisation step" or "off-line prepolymerisation".

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264 which are all herewith incorporated by reference in their entirety. Preferable embodiments of this aspect of the invention are described herein.

As monomers in the catalyst prepolymerisation step preferably alpha-olefins are used. Preferable $C_2$-$C_{10}$ alpha olefins, such as ethylene, propylene, 1-butene, 1-pentene, 1-hexene, 4-methyl-1-pentene, 1-heptene, 1-octene, 1-nonene 1-decene, styrene and vinylcyclohexane are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree defined as weight of polymer matrix/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimizing leaching of catalyst components and thus local overheating.

After prepolymerisation, the catalyst can be isolated and stored.

Polymerisation

The present invention is furthermore directed to a process for the preparation of the heterophasic propylene polymer (HECO) according to the present invention.

The polymers of the invention can be prepared by blending the necessary components that have been formed separately. However, the polymers are typically and preferably made in a multistep process well known in the art. A preferred multistage process is a "loop-gas phase"-process, such as developed by Borealis A/S, Denmark (known as BORSTAR® technology) described e.g. in patent literature, such as in EP-A-0887379 or in WO 92/12182.

The invention preferably relates to the copolymerisation of propylene, ethylene and, optionally further comonomers as defined above and below, in at least two step a process so as to form the heterophasic propylene polymer (HECO). Preferably, propylene and ethylene are the only monomers used.

Polymerization in the method of the invention may be effected in two or more, e.g. 2 or 3, polymerization reactors. The process may also involve a prepolymerisation reaction. This prepolymerisation step is a conventional step used routinely in polymer synthesis and is to be distinguished from the catalyst prepolymerisation step discussed above.

Ideally, the process of the invention employs three main reactors, a first reactor operating in bulk, a first gas phase reactor and a second gas phase reactor. As outlined above, the process may also utilize a prepolymerisation step. This prepolymerisation step may be effected in the first reactor or may be effected in a prepolymerisation reactor which is not one of the afore-mentioned main reactors. In case of bench-scale polymerisation prepolymerisation is frequently effected in the first (bulk) reactor whereas in production at a larger scale the prepolymerisation is usually effected in a prepolymerisation reactor which is not one of the afore-mentioned main reactors.

The inventive process of the invention forms the heterophasic propylene polymer (HECO). In that polymer, it is preferred that the first component, the matrix component (M) is a propylene homopolymer or random copolymer, preferably propylene homopolymer, and is subsequently combined with a copolymeric amorphous fraction to form the heterophasic propylene polymer (HECO) of the invention. The EPR fraction which is usually partially crystalline is preferably formed after formation of the matrix component and is preferably formed in the gas phase.

Ideally therefore a propylene homopolymer or random copolymer, preferably propylene homopolymer, as matrix component (M) is formed in a bulk step and a first gas phase step, and the EPR partially crystalline phase formed in the second gas phase step.

For bulk and gas phase copolymerisation reactions, the reaction temperature used will generally be in the range 60 to 115° C. (e.g. 70 to 110° C.), the reactor pressure will generally be in the range 10 to 40 bar for gas phase reactions with bulk polymerisation operating at slightly higher pressures. The residence time will generally be 0.25 to 8 hours (e.g. 0.3 to 3 hours). The gas used will be the monomer optionally as mixture with a non-reactive gas such as nitrogen or propane. It is a particular feature of the invention that polymerisation takes place at temperatures of at least 60° C.

Generally, the quantity of catalyst used will depend upon the nature of the catalyst, the reactor types and conditions and the properties desired for the polymer product. As is well known in the art hydrogen can be used for controlling the molecular weight of the polymer.

The heterophasic propylene polymer (HECO) can be prepared with the catalysts of the invention and the activity of this catalyst in both liquid and gas phase is much better than that obtained with a standard metallocenes. The higher activity in bulk and gas phase makes those of the invention the preferred catalyst.

In general, therefore the catalysts of use in the manufacture of the polymers of the invention can provide:
high activity in bulk propylene polymerisation;
high activity obtained in $C_2/C_3$ copolymerization in gas phase;
good polymer morphology.

Composition

The present invention is furthermore directed to a composition comprising
the heterophasic propylene polymer (HECO) according to the invention; and
a nucleating agent (NA).

The composition may further comprise an inorganic filler, which, however, is not preferred.

Usually the heterophasic propylene polymer (HECO) makes up at least 90.0 wt. % of the composition, preferably at least 95.0 wt. % of the composition and most preferably at least 97.5 wt. % of the composition.

Generally, nucleating agents promote the formation of crystallization nuclei when a melt of polypropylene is solidified and are thus increasing the crystallization speed and temperature of nucleated polypropylene compared to non-nucleated polypropylene.

As outlined above, by adding a nucleating agent the brittle-to-ductile transition temperature can further be lowered.

The nucleating agent is preferably an alpha-nucleating agent.

The polyolefin composition usually contains up to 2 wt % of at least one alpha-nucleating agent. A lower limit of 0.001 wt % of alpha-nucleating agent is preferred. Preferably the polyolefin composition comprises 0.005 to 0.5 wt %, more preferably 0.01 to 0.3 wt %, most preferably 0.04 to 0.25 wt % of at least one alpha-nucleating agent. The weight percent in the afore paragraph refer to the total amount of alpha-nucleating agents present.

Smaller amounts of alpha-nucleating agent than 0.001 wt % usually do not give the desired level of effect, while with larger amounts than 2 wt %, although giving the desired effect, the polyolefin compositions are becoming too expensive because of the high priced nucleating agents.

The alpha-nucleating agents which may be used for the polyolefin composition of the invention include organic alpha-nucleating agents selected from the group of phosphorous based nucleating agents like phosphoric acid esters metal salts represented by formula I

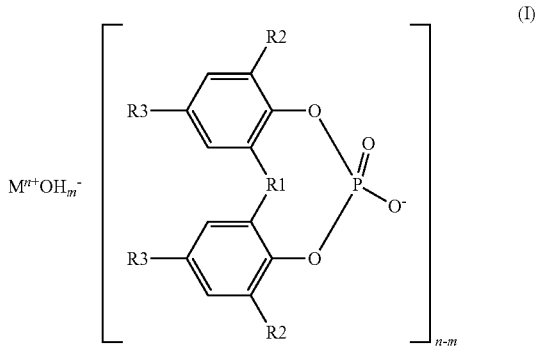

wherein R1 is oxygen, sulphur or a hydrocarbon group of 1 to 10 carbon atoms; each of R2 and R3 is hydrogen or a hydrocarbon or a hydrocarbon group of 1 to 10 carbon atoms; R2 and R3 may be the same or different from each other, two of R2, two of R3, or R2 and R3 may be bonded together to form a ring, M is a monovalent to trivalent metal atom; n is an integer from 1 to 3 and m is either 0 or 1, provided that n>m.

Preferred examples of the alpha nucleating agents represented by the above formula include sodium-2,2'-methylene-bis(4,6-di-t-butyl-phenyl)phosphate, sodium-2,2'-ethylidene-bis(4,6-di-t-butylphenyl)-phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl) phosphate, calcium-bis[2,2'-thiobis(4-methyl-6-t-butyl-phenyl)-phosphate], calcium-bis[2,2'-thiobis(4-ethyl-6-t-butylphenyl)-phosphate], calcium-bis[2,2'-thiobis(4,6-di-t-butylphenyl)phosphate], magnesium-bis[2,2'-thiobis(4,6-di-t-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-t-butyl-phenyl)-phosphate, sodium-2,2'-t-octylmethylene-bis(4,6-dimethyl-phenyl)-phosphate, sodium-2,2'-t-octylmethylene-bis(4,6-di-t-butylphenyl)-phosphate, calcium-bis[2,2'-methylene-bis(4,6-di-t-butylphenyl)-phosphate], magnesium-bis[2,2'-methylene-bis(4,6-di-t-butylphenyl)-phosphate], barium-bis[2,2'-methylene-bis(4,6-di-t-butylphenyl)-phosphate], sodium-2,2'-methylene-bis(4-methyl-6-t-butylphenyl)-phosphate, sodium-2,2'-methylene-bis(4-ethyl-6-t-butylphenyl)phosphate, sodium(4,4'-dimethyl-5,6'-di-t-butyl-2,2'-biphenyl) phosphate, calcium-bis-[(4,4'-dimethyl-6,6'-di-t-butyl-2,2'-biphenyl)phosphate], sodium-2,2'-ethylidene-bis(4-m-butyl-6-t-butylphenyl)phosphate, sodium-2,2'-methylene-bis-(4,6-di-methylphenyl)-phosphate, sodium-2,2'-methylene-bis(4,6-di-t-ethyl-phenyl)phosphate, potassium-2,2'-ethylidene-bis(4,6-di-t-butylphenyl)-phosphate, calcium-bis[2,2'-ethylidene-bis(4,6-di-t-butylphenyl)-phosphate], magnesium-bis[2,2'-ethylidene-bis(4,6-di-t-butylphenyl)-phosphate], barium-bis[2,2'-ethylidene-bis-(4, 6-di-t-butylphenyl)-phosphate], aluminium-hydroxy-bis[2, 2'-methylene-bis(4,6-di-t-butyl-phenyl)phosphate], aluminium-tris[2,2'-ethylidene-bis(4,6-di-t-butylphenyl)-phosphate].

A second group of phosphorous based nucleating agents includes for example aluminium-hydroxy-bis[2,4,8,10-tetrakis(1,1-dimethylethyl)-6-hydroxy-12H-dibenzo-[d,g]-dioxa-phoshocin-6-oxidato] and blends thereof with Li-myristate or Li-stearate.

Of the phosphorous based nucleating agents sodium-2,2'-methylene-bis(4,6-di-t-butylphenyl)phosphate or aluminium-hydroxy-bis[2,2'-methylene-bis(4,6-di-t-butyl-phenyl)-phosphate] or aluminium-hydroxy-bis-[2,4,8,10-tetrakis(1,1-dimethylethyl)-6-hydroxy-12H-dibenzo-[d,g]-dioxa-phoshocin-6-oxidato] or blends thereof with Li-myristate or Li-stearate are especially preferred.

Also sorbitol-based nucleating agents, i.e. di(alkylbenzylidene)sorbitols like 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol or pine rosin can be used as nucleating agents, as well as nonitol derivatives, like 1,2,3-trideoxy-4,6;5,7-bis-O-[(4-propylphenyl)methylene] nonitol, and benzene-trisamides like substituted 1,3,5-benzenetrisamides as N,N',N''-tris-tert-butyl-1,3,5-benzenetricarboxamide, N,N', N''-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl(cyclo)alkane polymer. These methods are described in greater detail in e.g. EP 0 316 187 A2 and WO 99/24479, the disclosure of which is incorporated herein by reference.

Suitable alpha-nucleating agents for the polyolefin composition of the invention are in addition nucleating agents, as described for example in Macromolecules 2005, 38, 3688-3695, the disclosure of which is incorporated herein by reference.

Nucleating agents such as ADK NA-11 (Methylen-bis(4, 6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) are commercially available from Asahi Denka Kokai and are among those which are preferably added to the polyolefin composition of the invention. Millad 3988 1,3:2,4 Bis(3,4-dimethylbenzylidene) sorbitol, Millad 3905 and Millad 3940 available from Milliken & Company are other examples of nucleating agents that can be utilised in the invention.

Further commercial available alpha-nucleating agents, which can be used for the composition of the invention are, for example, Irgaclear XT 386 (N-[3,5-bis-(2,2-dimethyl-propionylamino)-phenyl]-2,2-dimethylpropionamide) from Ciba Speciality Chemicals, Hyperform HPN-68L and Hyperform HPN-20E from Milliken & Company.

Among all alpha-nucleating agents mentioned above, aluminium hydroxy-bis[2,4,8,10-tetrakis(1,1-dimethyl-ethyl)-6-hydroxy-12H-dibenzo-[d,g]-dioxa-phoshocin-6-oxidato] based nucleating agents like ADK NA-21, NA-21 E, NA-21 F, etc., sodium-2,2'-methylene-bis(4,6-di-t-butylphenyl)phosphate (ADK NA-11), aluminium-hydroxy-bis[2,2'-methylene-bis(4,6-di-t-butyl-phenyl)-phosphate], sorbitol-based nucleating agents, i.e. di(alkylbenzylidene) sorbitols like 1,3:2,4-25 dibenzylidene sorbitol, 1,3:2,4-di(4-methylbenzylidene) sorbitol, 1,3:2,4-di(4-ethylben-zylidene) sorbitol and 1,3:2,4-Bis(3,4-dimethylbenzylidene) sorbitol, as well as nonitol derivatives, like 1,2,3-trideoxy-4,6;5,7-bis-0-[(4-propylphenyl)methylene] nonitol, and benzene-trisamides like substituted 1,3,5-benzenetrisamides as N,N',N''-tris-tert-butyl-1,3,5-benzenetricarboxamide, N,N',N''-tris-cyclohexyl-1,3,5-benzene-tricarboxamide and N-[3,5-bis-(2,2-dimethyl-propionylamino)-phenyl]-2,2-di-methyl-propionamide, wherein 1,3:2,4-di(4-methylben-zylidene) sorbitol and N-[3,5-bis-(2,2-dimethyl-propio-nylamino)-phenyl]-2,2-dimethyl-propionamide and polymeric nucleating agents selected from the group consisting of vinylcycloalkane polymers and vinylalkane polymers are particularly preferred.

Especially preferred are soluble nucleating agents like Millad 3988 (1,3:2,4-di(4-ethylbenzylidene) sorbitol and 1,3:2,4-Bis(3,4-dimethylbenzylidene) sorbitol) and Millad NX8000 (1,2,3-trideoxy-4,6;5,7-bis-O-[(4-propylphenyl) methylene] nonitol).

The composition is preferably having a melting temperature $T_m$ of 143 to 160° C.

The composition is preferably having a brittle-to-ductile transition temperature (BDTT) of −12.5° C. or below, more preferably −15.0° C. or below and most preferably −17.5° C. or below. The brittle-to-ductile transition temperature (BDTT) of the composition will usually not be below −40° C.

Preferably the Charpy notched impact strength of the composition, determined according to ISO 179-1eA:2000 and at a temperature of −19° C., is at least 4.0 kJ/m², more preferably at least 6.0 kJ/m². The Charpy notched impact strength of the composition, determined according to ISO 179-1eA:2000 and at a temperature of −19° C., will usually not be above 25 kJ/m².

Preferably the Charpy notched impact strength of the composition, determined according to ISO 179-1eA:2000 and at a temperature of +23° C., is at least 40.0 kJ/m², more preferably at least 45.0 kJ/m². The Charpy notched impact strength of the composition, determined according to ISO 179-1eA:2000 and at a temperature of +23° C., will usually not be above 80 kJ/m².

The flexural modulus of the composition, determined according to ISO 178, is preferably at least 600 MPa, more preferably at least 625 MPa and most preferably at least 650 MPa. Usually the flexural modulus of the composition will not exceed 950 MPa.

The haze of the heterophasic propylene polymer (HECO), determined according to ASTM D 1003-07 on 1 mm thick specimen, is preferably 80% or below, more preferably 75% or below and most preferably 70% or below.

Article

The present invention is furthermore directed to an article comprising the heterophasic propylene polymer (HECO) according to the present invention or comprising the composition according to the present invention.

Preferably, the article is a film, such as a cast, blown or BOPP films, moulded articles, e.g. injection moulded, blow moulded, rotomoulded articles, extrusion coatings. Particularly preferred articles are packing articles, e.g. packaging films, such as heavy duty sacks, hygiene films, lamination films, and soft packaging films.

Due to their excellent low temperature properties, films comprising the heterophasic propylene polymer (HECO) according to the present invention or comprising the composition according to the present invention are ideal for use in frozen packaging.

The invention will now be described with the following non-limiting examples.

Experimental Part

Intrinsic viscosity is measured according to DIN ISO 1628:2009 (in Decalin at 135° C.).

Charpy notched impact strength was determined according to ISO 179-1eA:2000 on V-notched samples of 80×10×4 mm³ at 23° C. (Charpy impact strength (23° C.)) and −19° C. (Charpy impact strength (−19° C.)). A standard impact velocity of 1.5 m/s was used. The test specimens having a dimension of 80×10×4 mm³ were cut from the central part of ISO multibar specimens prepared by injection moulding in line with ISO 1873-2.

The flexural modulus was determined according to ISO 178 at a test speed of 2 mm/min and a force of 100 N, whereby the length of the span between the supports was 64 mm, on test specimens having a dimension of 80×10×4 mm³ (length×width×thickness) prepared by injection moulding according to EN ISO 1873-2.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellec-chia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs. For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically, the influence of regio-defects and comonomer on the quantification of the tacticity distribution was corrected for by subtraction of representative regio-defect and comonomer integrals from the specific integral regions of the stereo sequences. The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-%=100*($P_{21e}/P_{total}$)

The comonomer content was determined by quantitative nuclear magnetic resonance (13C-NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

$MFR_2$ (230° C.) is measured according to ISO 1133 (230° C., 2.16 kg load).

The xylene cold soluble fraction (XCS, wt.-%): The amount of the polymer soluble in xylene is determined at 25° C. according to ISO 16152; 5$^{th}$ edition; 2005 Jul. 1. The remainder is the xylene cold insoluble fraction (XCI).

DSC analysis, melting temperature ($T_m$) and heat of fusion ($H_f$), crystallization temperature ($T_c$) and heat of crystallization ($H_c$): measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and heat of fusion ($H_f$) are determined from the second heating step.

The glass transition temperature Tg is determined by dynamic mechanical analysis according to ISO 6721-7. The measurements are done in torsion mode on compression moulded samples (40×10×1 mm³) between −100° C. and +150° C. with a heating rate of 2° C./min and a frequency of 1 Hz.

The determination of the brittle-to-ductile transition temperature (BDTT) is based on the a(cN) values as determined from Charpy instrumented impact strength according to ISO 179-2:2000 on V-notched specimen with a geometry of 80×10×4 mm³ as required in ISO 179-1eA.

The a(cN) values are determined in intervals of 3° C. from −40° C. to +41° C. with an impact velocity of 1.5 m/s and plotted over temperature, calculating the BDTT as the average value of the step increase. For a detailed description of the determination of the BDTT reference is made to Grein, C. et al, Impact Modified Isotactic Polypropylene with Controlled Rubber Intrinsic Viscosities: Some New Aspects About Morphology and Fracture, J Appl Polymer Sci, 87 (2003), 1702-1712.

The haze is measured on a 60×60×1 mm³ injection molded specimen according to ASTM D 1003-07.

GPC: Molecular weight averages, molecular weight distribution, and polydispersity index (Mn, Mw, Mw/Mn)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methylphenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Catalyst Preparation

Catalyst 1

Rac-dimethylsilanediylbis[2-methyl-4-(4-tert-butylphenyl)-1,5,6,7-tetrahydro-s-indacen-1-yl] zirconium dichloride which was prepared following the general procedure in WO 2015/158790 which is herewith incorporated by reference.

Catalyst 2

The catalyst complex rac-dimethylsilanediyl[2-methyl-4-(4-tert-butylphenyl)-inden-1-yl][2-methyl-4-(4-tert-butylphenyl)-5-methoxy-6-tert.-butyl-inden-1-yl] zirconium dichloride was prepared as disclosed in WO 2013/007650 which is herewith incorporated by reference.

Catalyst 3

This is the Ziegler-Natta catalyst prepared according to the inventive examples of EP 2 307 467 which is herewith incorporated by reference.

Catalyst 4

Rac-cyclohexylmethylsilanediylbis[2-methyl-4-(4-tert-butylphenyl)-inden-1-yl] zirconium dichloride which was prepared as described in example 10 of WO 2010/052263 A1 which is herewith incorporated by reference.

Catalyst Preparation Catalysts 1, 2 and 4:

Inside the glovebox, 54 μL of dry and degassed mixture of perfluoroalkylethyl acrylate ester (used as surfactant) were mixed with 2 mL of MAO in a septum bottle and left to react overnight. The following day, 44.50 mg of the metallocene (0,051 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (450 equivalents). An emulsion formed immediately and stirred during 15 minutes at −10° C./600 rpm. Then the emulsion was transferred via a ⅔ teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow.

Off-Line Pre-Polymerisation Procedure:

The catalyst as prepared above was pre-polymerised according to the following procedure Off-line pre-polymerisation experiments were done in a 125 mL pressure reactor equipped with gas-feeding lines and an overhead stirrer. Dry and degassed perfluoro-1,3-dimethylcyclohexane (PFC)(15 ml) and the desired amount of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were then connected. The experiment was started by opening the propylene feed into the reactor and setting the stirrer speed at 450 rpm. The propylene feed was left open and the monomer consumption was compensated by keeping the total pressure in the reactor constant (about 5 barg). The experiment was continued for the polymerisation time (17.5 min) sufficient to provide the desired degree of polymerisation (DP). The reactor was then taken back inside the glove box before opening and the content was poured into a glass vessel. PFC was evaporated until a constant weight was obtained to yield 2.90 g of the pre-polymerised catalyst. The degree of polymerisation (DP) was determined gravimetrically and/or by analysis of the ash and/or aluminium content of the catalyst.

|  | catalyst 1 | catalyst 2 | catalyst 4 |
|---|---|---|---|
| amount of catalyst used [mg] | 31.3 | 32.7 | 61.0 |
| yield of prepolymerised catalyst [mg] | 122 | 157 | 250 |
| prepolymerisation degree g(PP)/g(cat) | 2.9 | 3.8 | 3.1 |

Polymerisation

The heterophasic compositions have been prepared by means of a 3-step polymerization (bulk homopolymerisation+gas phase (GP1) homopolymerisation+gas phase (GP2) $C_2/C_3$ copolymerisation) in a 20-L reactor, as described below.

Step 1: Bulk Propylene Homopolymerization

A stirred autoclave (double helix stirrer) with a volume of 21.2 dm³ containing 0.2 bar-g propylene, was filled with additional 3.97 kg propylene plus the amount of $H_2$ indicated in the table. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst (type as listed in the tables) was loaded into a 5-mL stainless steel vial inside the glovebox, the vial was attached to the autoclave, then a second 5-mL vial containing 4 ml n-hexane and pressurized with 10 bars of $N_2$ was added on top, the valve between the two vials was opened and the solid catalyst was contacted with hexane under $N_2$ pressure for 2 s, then flushed into the reactor with 250 g propylene. Stirring speed was increased to 250 rpm and pre-polymerisation was run for 10 min at 20° C. At the end of the prepolymerization step, the stirring speed was increased to 350 rpm and the polymerisation temperature increased to 80° C. When the internal reactor temperature reached 71° C., the amount of $H_2$ indicated in the table was added with a defined flow via thermal mass flow controller. The reactor temperature was held constant throughout the polymerization. The polymerization time was measured starting when the temperature was 2° C. below the set polymerization temperature.

Step 2: Gas Phase: Propylene Homopolymerization (GP1)

After the bulk step was finished, the stirrer speed was adjusted to 50 rpm and the reactor pressure was reduced to 0.5 bar below the set pressure by venting. Then the stirrer speed was set to 250 rpm, the reactor temperature to 80° C. and the amount of $H_2$ indicated in the table was dosed via MFC. Then the reactor P and T were held constant by propylene feed via MFC until the target split had been reached.

Step 3: Gas Phase: Ethylene/Propylene Copolymerization (GP2)

When the GP1 had been finished, the stirrer speed was reduced to 50 rpm. The reactor pressure was lowered to 0.3 barg by venting, the temperature and control device was set to 70° C. Then the reactor was filled with 200 g propylene at a flow of 70 g/min and flushed again to 0.3 barg.

Afterwards the stirrer speed was adjusted to 250 rpm. Then the reactor was filled with the chosen $C_3/C_2$ monomer ratio (transition feed, see table). The speed of the reactor filling during the transition was limited by the max. flow of the gas flow controllers. When the reactor temperature reached 69° C. and the reactor pressure reached the set value, the composition of the fed $C_3/C_2$ mixture was changed to the target copolymer composition and temperature and pressure were held constant until the amount of $C_3/C_2$ gas mixture required to reach the target rubber split had been consumed.

The reaction was stopped by setting the stirrer speed to 20 rpm, cooling the reactor to 30° C. and flashing the volatile components.

After flushing the reactor twice with $N_2$ and one vacuum/$N_2$ cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

TABLE 1

|  |  | RE1 | IE2 | IE3a |
|---|---|---|---|---|
| catalyst |  | 1 | 2 | 1 |
| Prepolymerisation |  |  |  |  |
| res. time | min | 10 | 10 | 10 |
| $H_2$ | Nl | 0 | 0 | 0 |
| Bulk polymerisation |  |  |  |  |
| Total $H_2$ | Nl | 1.5 | 3.0 | 1.5 |
| res. time | min | 30 | 20 | 30 |
| GP1 (homopolymerisation) |  |  |  |  |
| $H_2$ | Nl | 0.75 | 1.10 | 0.35 |
| res. time | min | 63 | 55 | 71 |
| GP2 (copolymerisation) |  |  |  |  |
| $H_2$ | Nl | 0 | 0 | 0 |
| res. time | min | 105 | 87 | 55 |
| $C_2/C_3$ ratio transition | wt/wt | 0.44 | 0.48 | 0.38 |
| GP2 $C_3$ feed | g | 470 | 369 | 429 |
| GP2 $C_2$ feed | g | 84 | 59 | 64 |
| GP2 $C_2/C_3$ ratio | wt/wt | 0.18 | 0.16 | 0.15 |

RE: reference example;
IE: Inventive example

TABLE 2

|  |  | CE3 | CE4 |
|---|---|---|---|
| catalyst |  | 4 | 4 |
| Prepolymerisation |  |  |  |
| res. time | min | 10 | 10 |
| $H_2$ | Nl | 0 | 0 |
| Bulk polymerisation |  |  |  |
| Total $H_2$ | Nl | 1.8 | 2.0 |
| res. time | min | 30 | 30 |
| GP1 (homopolymerisation) |  |  |  |
| $H_2$ | Nl | 0.32 | 0.32 |
| res. time | min | 54 | 68 |
| GP2 (copolymerisation) |  |  |  |
| $H_2$ | Nl | 0 | 0 |
| res. time | min | 62 | 78 |
| $C_2/C_3$ ratio transition | wt/wt | 0.86 | 0.50 |
| GP2 $C_3H_6$ feed | g | 490 | 423 |
| GP2 $C_2H_4$ feed | g | 211 | 105 |
| GP2 $C_2/C_3$ ratio | wt/wt | 0.43 | 0.25 |

CE1 is the commercial random-heterophasic copolymer Borsoft SD233CF commercially available from Borealis AG, Austria. The polymer is based on a conventional 4th generation Ziegler-Natta type catalyst.

Comparative example CE2 is a blend of 30 wt. % Vistamaxx 6102, a commercial propylene-ethylene elastomer (obtainable from ExxonMobil, USA) having an ethylene content of 16 wt % %, density of 0.862 g/cm$^3$ and a MFR (190° C., 2.16 kg) of 1.4 g/10 min and 70% PP-H being a monomodal polypropylene homopolymer having an $MFR_2$ of 30 g/10 min based on catalyst 4 and produced in a Borstar PP pilot plant in a single loop reactor.

All polymer powders were compounded in a lab-scale 24 mm co-rotating twin-screw extruder with 400 ppm calcium Stearate (CAS No. 1592-23-0), 1000 ppm Irganox 1010 supplied by BASF AG, Germany (Pentaerythrityl-tetrakis (3-(3',5'-di-tert. butyl-4-hydroxyphenyl)-propionate, CAS No. 6683-19-8) and 500 ppm of Irgafos 168 supplied by BASF AG Germany (CAS No. 31570-04-4, Tris (2,4-di-t-butyphenyl)phosphite).

In IE3b the product obtained in example IE3a was additionally nucleated with 2000 ppm of 1,3:2,4-Bis (3,4-dimethylobenzylideno) sorbitol (CAS No. 13586-56-2, DMDBS, type Millad 3988 supplied by Milliken, USA) in the compounding step.

The split is given in the following table [in wt. %]

TABLE 3

|  | bulk | GP1 | GP2 |
|---|---|---|---|
| RE1 | 43 | 26 | 31 |
| IE2 | 40 | 31 | 29 |
| IE3a | 38 | 33 | 29 |
| IE3b | 38 | 33 | 29 |
| CE3 | 34 | 33 | 33 |
| CE4 | 35 | 30 | 35 |

The properties of the polymers are as follows

TABLE 4

|  |  | RE1 | IE2 | IE3a | IE3b |
|---|---|---|---|---|---|
| MFR GP1 | g/10 min | 35 | 35 | 35 | 35 |
| MFR total | g/10 min | 8 | 13 | 9 | 9 |
| 2,1-erythro regiodefects (XCI) | mol % | 0.52 | 0.58 | 0.52 | 0.52 |
| IV (XCI) | dl/g | 1.65 | 1.64 | 1.63 | 1.63 |
| IV (XCS) | dl/g | 2.74 | 2.31 | 2.49 | 2.49 |
| XCS content | wt. % | 26.8 | 30.7 | 28.6 | 28.6 |
| $C_2$(XCS) | wt. % | 17.5 | 14.1 | 14.8 | 14.8 |
| $C_2$ total | wt. % | 4.3 | 4.5 | 4.0 | 4.0 |
| BDTT | ° C. | −10 | −7 | −10 | −20 |
| Charpy notched impact strength |  |  |  |  |  |
| −19° C. | kJ/m$^2$ | 4.8 | 3.2 | 4.8 | 8.3 |
| +23° C. | kJ/m$^2$ | 58.8 | 50.0 | 59.0 | 59.0 |
| haze 1 mm | % | 67 | 65 | 45 | 31 |
| flexural modulus | MPa | 654 | 723 | 635 | 699 |
| $T_g$ (XCS) | ° C. | −30.0 | −31.8 | −27.6 | −27.9 |
| $T_g$ (XCI) | ° C. | 0.0 | −2.2 | −4.0 | −3.8 |

TABLE 5

|  |  | CE1 | CE2 | CE3 | CE4 |
|---|---|---|---|---|---|
| MFR GP1 | g/10 min | 8 | 35 | 35 | 35 |
| MFR total | g/10 min | 7 | 16 | 35 | 34 |
| 2,1-erythro regiodefects (XCI) | mol % | 0 | 0.82 | 0.91 | 0.91 |
| IV (XCI) | dl/g | 2.37 | 1.64 | 1.64 | 1.64 |
| IV (XCS) | dl/g | 1.70 | 2.85 | 0.80 | 0.84 |
| XCS content | [wt. %] | 23.0 | 30.8 | 32.9 | 27.0 |
| $C_2$(XCS) | [wt. %] | 25.0 | 16.0 | 30.0 | 16.6 |
| $C_2$ total | [wt. %] | 8.5 | 4.8 | 8.3 | 5.9 |
| BDTT | ° C. | 35 | 5 | 10 | 13 |
| Charpy notched impact strength |  |  |  |  |  |
| −19° C. | kJ/m$^2$ | 1.9 | 3.9 | 5.6 | 2.3 |
| +23° C. | kJ/m$^2$ | 13.4 | 37.0 | 52.6 | 13.0 |
| haze 1 mm | [%] | 65 | 84 | 77 | 25 |
| flexural modulus | [MPa] | 590 | 592 | 764 | 505 |
| $T_g$ (XCS) | ° C. | −50.0 | −34.0 | −44.6 | −34.3 |
| $T_g$ (XCI) | ° C. | −6.1 | −0.3 | −0.8 | −4.4 |

As can be seen from the above tables the inventive polymers show an improved combination of mechanical and optical properties, particularly low brittle-to-ductile transition temperature (BDTT). Furthermore, unexpectedly, by adding a nucleating agent the BDTT can further be lowered.

The invention claimed is:
1. A heterophasic propylene polymer (HECO) comprising:

a) 65 to 90 wt. % of a matrix component (M) selected from a propylene homo- or random copolymer (PP); and
b) 10 to 35 wt. % of an ethylene-propylene rubber (EPR), dispersed in the propylene homo- or random copolymer (PP), whereby the xylene cold soluble fraction (XCS) of the heterophasic propylene polymer (HECO) has an ethylene content of 10.0 to 17.0 wt. %;

an intrinsic viscosity (IV), determined according to ISO 1628-1:2009, of at least 1.6 dl/g; and the xylene cold insoluble fraction (XCI) of the heterophasic propylene polymer (HECO) has 2,1-erythro regiodefects in an amount of at least 0.4 mol %.

2. The heterophasic propylene polymer (HECO) according to claim 1, wherein the intrinsic viscosity (IV) of the xylene cold solubles fraction (XCS) is higher than the intrinsic viscosity (IV) of the xylene cold insoluble fraction (XCI).

3. The heterophasic propylene polymer (HECO) according to claim 1, wherein the xylene cold solubles fraction (XCS) has an intrinsic viscosity (IV) of 1.8 to 3.5 dl/g.

4. The heterophasic propylene polymer (HECO) according to claim 1, whereby the heterophasic propylene polymer (HECO) has an MFR, determined according to ISO 1133 at 230° C. and under a load of 2.16 kg, of 3.0 to 100 g/10 min.

5. The heterophasic propylene polymer (HECO) according to claim 1, whereby the glass transition temperature of the xylene cold soluble fraction (XCS) is −29.0° C. or higher.

6. The heterophasic propylene polymer (HECO) according to claim 1, whereby the matrix component (M) comprises at least 96.0 wt. % propylene monomers based on the entirety of the matrix component (M).

7. The heterophasic propylene polymer (HECO) according to claim 6, whereby the matrix component (M) is a propylene homopolymer.

8. The heterophasic propylene polymer (HECO) according to claim 1, whereby the matrix component (M) has an MFR, determined according to ISO 1133 at 230° C. and under a load of 2.16 kg, of 1.0 to 100 g/10 min.

9. The heterophasic propylene polymer (HECO) according to claim 1, being obtainable by a single-site catalyst.

10. The heterophasic propylene polymer (HECO) according to claim 1, having a melting temperature $T_m$ of 143 to 160° C.

11. The heterophasic propylene polymer (HECO) according to claim 1, having a brittle-to-ductile transition temperature (BDTT) of −5.0° C. or below.

12. The heterophasic propylene polymer (HECO) according to claim 1, wherein the ratio of the MFR of the matrix component (M) to the MFR of the (HECO), both determined according to ISO 1133 at 230° C. and under a load of 2.16 kg, is at least 2.0.

13. A composition comprising
the heterophasic propylene polymer (HECO) according to claim 1; and
a nucleating agent (NA).

14. An article comprising the heterophasic propylene polymer (HECO) according to claim 1.

15. The article of claim 1, comprising a composition that includes the heterophasic propylene polymer (HECO) and a nucleating agent (NA).

* * * * *